United States Patent
Turtinen et al.

(10) Patent No.: US 11,570,818 B2
(45) Date of Patent: Jan. 31, 2023

(54) BEAM FAILURE RECOVERY

(71) Applicant: Nokia Technologies Oy, Espoo (FI)

(72) Inventors: Samuli Turtinen, Ii (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 220 days.

(21) Appl. No.: 16/958,786

(22) PCT Filed: Jan. 8, 2019

(86) PCT No.: PCT/FI2019/050008
§ 371 (c)(1),
(2) Date: Jun. 29, 2020

(87) PCT Pub. No.: WO2019/141898
PCT Pub. Date: Jul. 25, 2019

(65) Prior Publication Data
US 2020/0351954 A1 Nov. 5, 2020

Related U.S. Application Data

(60) Provisional application No. 62/619,567, filed on Jan. 19, 2018.

(51) Int. Cl.
*H04W 74/08* (2009.01)
*H04W 72/04* (2009.01)
*H04W 84/04* (2009.01)

(52) U.S. Cl.
CPC ..... *H04W 74/0833* (2013.01); *H04W 72/046* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 10,681,742 B2 * | 6/2020 | Tsai | H04W 74/0841 |
| 2015/0016312 A1 * | 1/2015 | Li | H04W 74/006 370/280 |

(Continued)

FOREIGN PATENT DOCUMENTS

WO 2017/204934 A1 11/2017

OTHER PUBLICATIONS

"LS to RAN2 on Beam Failure Recovery", 3GPP TSG RAN WG2#AH-1801 , R2-1800003, RAN1, Jan. 22-26, 2018, 3 pages.

(Continued)

*Primary Examiner* — Faiyazkhan Ghafoerkhan
(74) *Attorney, Agent, or Firm* — Nokia Technologies Oy

(57) ABSTRACT

There is provided a method comprising: determining that a random access procedure is to be applied in response to initiating a beam failure recovery, BFR, procedure; selecting a beam with which the random access procedure is to be attempted; determining whether or not the selected beam is allocated with a contention free preamble; and performing one of the following: 1) upon determining the positive, applying a contention free random access, CFRA, procedure based on a first limit for an access attempt counter; and 2) upon determining the negative, applying a contention based random access, CBRA, procedure based on a second limit for the access attempt counter, wherein the first and second limits are different.

20 Claims, 5 Drawing Sheets

(56) References Cited

U.S. PATENT DOCUMENTS

| | | | | |
|---|---|---|---|---|
| 2016/0270121 | A1* | 9/2016 | Bergström | H04W 74/0833 |
| 2017/0006641 | A1* | 1/2017 | Dinan | H04W 74/0833 |
| 2018/0020487 | A1* | 1/2018 | Tsai | H04W 74/004 |
| 2018/0376428 | A1* | 12/2018 | Lin | H04W 52/146 |
| 2019/0053314 | A1* | 2/2019 | Zhou | H04B 7/088 |
| 2019/0089447 | A1* | 3/2019 | Sang | H04W 76/19 |
| 2019/0215048 | A1* | 7/2019 | Cirik | H04B 7/088 |
| 2019/0215706 | A1* | 7/2019 | Tsai | H04W 72/042 |
| 2020/0100179 | A1* | 3/2020 | Zhou | H04W 72/042 |
| 2020/0177263 | A1* | 6/2020 | Zhang | H04W 74/0833 |
| 2020/0351954 | A1* | 11/2020 | Turtinen | H04B 7/0695 |
| 2020/0367293 | A1* | 11/2020 | Zhang | H04W 76/19 |

OTHER PUBLICATIONS

"3rd Generation Partnership Project; Technical Specification Group Radio Access Network: NR; Medium Access Control (MAC) protocol specification (Release 15)", 3GPP TS 38.321 V15.0.0, Dec. 2017, pp. 1-55.

"Clarifications To Beam Recovery Procedure", 3GPP TSG-RAN WG2 NR Ad hoc 1801, R2-1800963, Agenda: 10.3.1.4.2, Nokia, Jan. 22-26, 2018, 8 pages.

"3rd Generation Partnership Project; Technical Specification Group Radio Access Network; NR; Physical layer procedures for control (Release 15)", 3GPP TS 38.213 V15.0.0, Dec. 2017, pp. 1-56.

International Search Report and Written Opinion received for corresponding Patent Cooperation Treaty Application No. PCT/FI2019/050008, dated Mar. 13, 2019, 18 pages.

Jiang et al., "Low RF-Complexity Massive MIMO Systems Based on Vertical Spatial Filtering for Urban Macro Cellular Networks", IEEE Transactions on Vehicular Technology, vol. 66, No. 10, Oct. 2017, pp. 9214-9225.

Office action received for corresponding Indonesian Patent Application No. P00202004590, dated May 9, 2022, 3 pages of office action and 3 pages of translation available.

* cited by examiner

BEAM FAILURE RECOVERY

RELATED APPLICATION

This application was originally filed as a Patent Cooperation Treaty Application No. PCT/F12019/050008 filed on Jan. 8, 2019, which claims priority from U.S. Provisional Patent Application No. 62/619,567, filed on Jan. 19, 2018, which is hereby incorporated in its entirety.

TECHNICAL FIELD

Various example embodiments relate generally to beam failure recovery including a random access procedure.

BACKGROUND

A user equipment (UE) may be connected to one or more beams for communication. For example, fifth generation wireless system (5G) is proposed to operate with multiple beams. That may mean that the UE is receiving and/or transmitting data with multiple beams during a communication session with the network and or another device. If a connection to a beam is lost e.g. due to signal level degradation, the UE may try to recover that or another beam before triggering a beam failure.

BRIEF DESCRIPTION

According some aspects, there is provided the subject matter of the independent claims. Some further aspects are defined in the dependent claims.

LIST OF THE DRAWINGS

In the following, the invention will be described in greater detail with reference to the embodiments and the accompanying drawings, in which FIGS. 1A and 1B present communication networks, according to some embodiments;

DESCRIPTION OF EMBODIMENTS

Figure 1A:
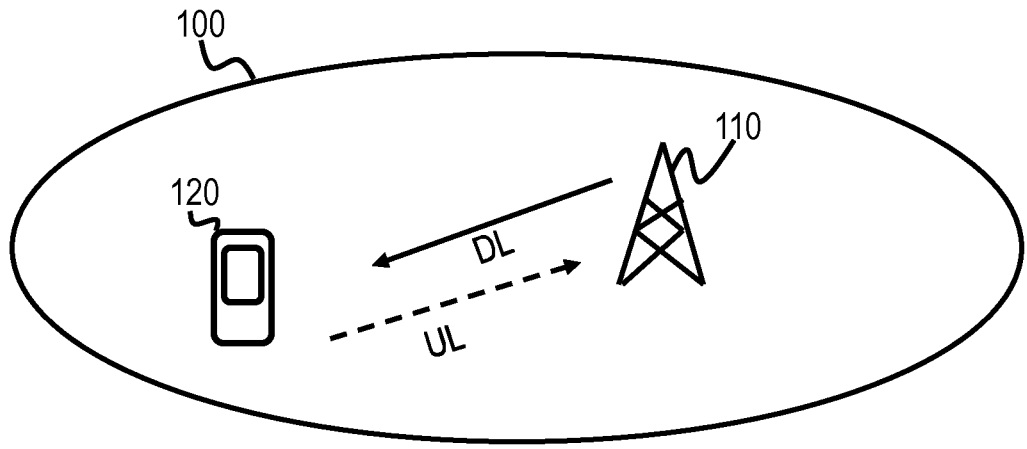

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as one comprising at least one of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN).

The embodiments are not, however, restricted to the systems/RATs given as an example but a person skilled in the art may apply the solution to other communication systems provided with necessary properties. One example of a suitable communications system is the 5G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integradable with existing legacy radio access technologies, such as the LTE.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard-band—or "standalone" for deployments in dedicated spectrum.

FIG. 1A illustrates an example of a communication system to which embodiments of the invention may be applied. The system may comprise a control node 110 providing a cell 100. Each cell may be, e.g., a macro cell, a micro cell, femto, or a pico cell, for example. In another point of view, the cell may define a coverage area or a service area of the access node 110. The control node 110 may be an evolved Node B (eNB) as in the LTE and LTE-A, ng-eNB as in eLTE, gNB of 5G, or any other apparatus capable of controlling radio communication and managing radio re-sources within a cell. For 5G solutions, the implementation may be similar to LTE-A, or e.g. apply virtualized networks. The control node 110 may be called a base station, network node, or an access node.

The system may be a cellular communication system composed of a radio access network of access nodes, each controlling a respective cell or cells. The access node 110 may provide user equipment (UE) 120 (one or more UEs) with wireless access to other networks such as the Internet. The wireless access may comprise downlink (DL) communication from the control node 110 to the UE 120 and uplink (UL) communication from the UE 120 to the control node 110. Additionally, one or more local area access nodes may be arranged within a control area of a macro cell access node. The local area access node may provide wireless access within a sub-cell that may be comprised within a macro cell. Examples of the sub-cell may include a micro, pico and/or femto cell. Typically, the sub-cell provides a hot spot within a macro cell. The operation of the local area access node may be controlled by an access node under whose control area the sub-cell is provided.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface Xw may be provided between access points. An interface between an eLTE access point and a 5G access point may be called Xn. Other communication methods between the access nodes may also be possible.

The access node 110 may be further connected via another interface to a core network of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and the core network may comprise an advanced mobility management entity (AMF) and a gateway node. The AMF may handle mobility of terminal devices in a tracking area encompassing a plurality of cells and handle signalling connections between the terminal devices and the core network. The gateway node may handle data routing in the core network and to/from the terminal devices.

Figure 1B:
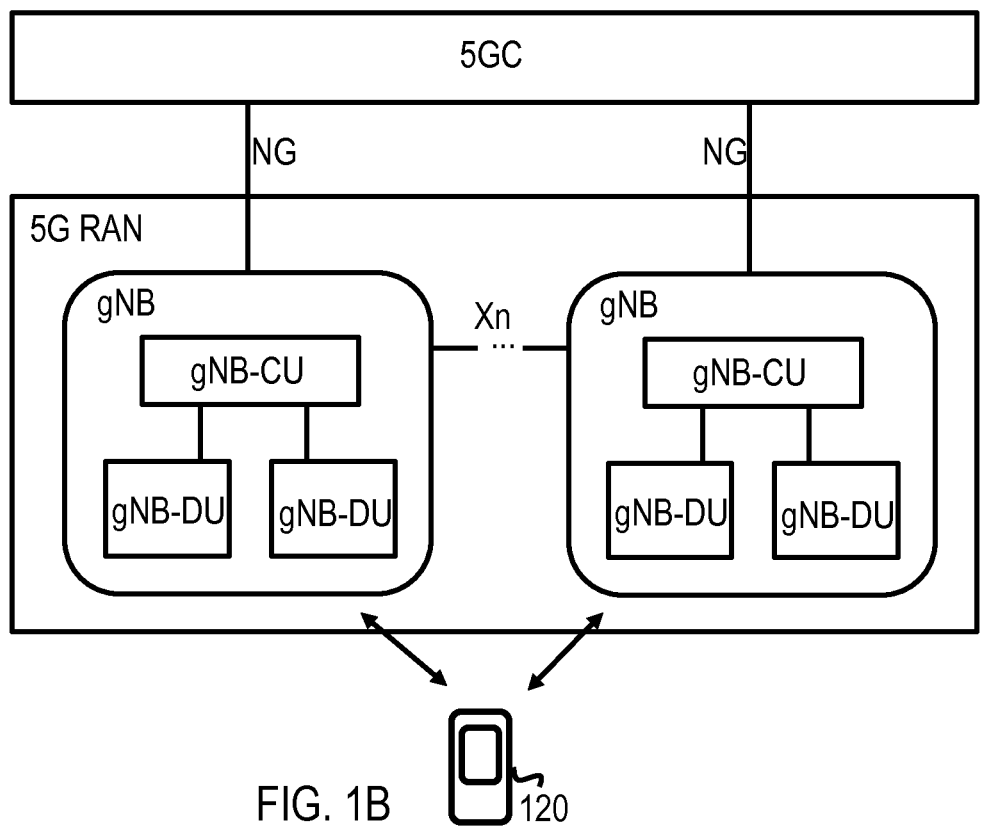

For 5G networks, it is envisaged that the architecture may be based on a so-called CU-DU (central unit-distributed unit) split, where one gNB-CU controls several gNB-DUs, as shown in FIG. 1B. The gNBs (one or more) may communicate with one or more UEs 120. As shown in FIG. 1B, the gNB-CU (central node) may control a plurality of spatially separated gNB-DUs, acting at least as transmit/receive (Tx/Rx) nodes. In some embodiments, however, the gNB-DUs (also called DUs) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer. Some other technology advancements probably to be used are Software-Defined Networking (SDN), Big Data, and all-IP, to mention only a few non-limiting examples. For example, network slicing may be a form of virtual network architecture using the same principles behind software defined networking (SDN) and network functions virtualisation (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs (access points/nodes), each comprising the CU and one or more DUs in the example of FIG. 1B, may be connected to each other via the Xn interface over which the gNBs may negotiate. The gNBs may also be connected over next generation (NG) interfaces to a 5G core network (5GC), which may be a 5G equivalent for the core network of LTE.

Such 5G CU-DU split architecture may be implemented using cloud/server so that the CU having higher layers locates in the cloud and the DU is closer to or comprises an actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU. Similar solutions have been considered also for eLTE/EUTRAN, so that eNB or ng-eNB (next generation eNB, e.g. an eNB that is connected to 5GC) might comprise central and distributed units, much like depicted in FIG. 1B for 5G.

Radio link monitoring (RLM) is a known procedure for ensuring that link quality degradation is detected at the UE and appropriate actions are taken. Conventionally a UE's Radio Resource Control (RRC) maintains counters and timers for the purpose of RLM. The RRC, upon receiving a sufficient amount of consecutive out-of-sync (OOS) indications from Layer 1 (L1), starts one of the timers. While that timer is running no specific actions are taken by the RRC and the RRC waits for the L1 to indicate a potential link recovery by indicating an in-sync (IS) indication. If the RRC receives a configured amount of consecutive IS indications from the L1 and the timer is running, the timer is stopped and no RLF occurs. Otherwise, if in the case L1 does not indicate the configured amount of consecutive IS indications before the timer expires, the UE RRC declares radio link failure (RLF) and initiates RRC level recovery to re-establish the RRC connection.

Substantially similar principle may be taken at a beam level. In a multibeam system, such as in the NR, for example, a cell may be covered using multiple narrow beams (narrow compared with the sector beams such as used in 4G for example). It may happen that a beam is lost due to a degraded signal quality which may be caused e.g. by the UE or any surrounding object moving. In case a connection is lost (i.e. a beam cannot be used for communication), the UE may try to recover that or some other beam by any conventional manners known to a skilled person. In case no beam can be recovered, a beam failure may be detected/declared and beam recovery may be triggered.

One means for recovering a beam is called beam failure recovery request (BFRR or alternatively BFRQ), which comprise the UE attempting to transmit a recovery request to the network over any detected beam to indicate new beam or beams for communication. This/these beam(s) may be referred as candidate beams. If the attempt is successful (e.g. UE has received gNB response and/or configured/indicated with new beam for communication), the UE has managed to re-establish a connection over the detected beam. In case the UE has several beams via which the UE is communicating with, and one or more of those (but not all) are lost, the UE may still attempt to re-establish the lost beams or connect with new beams according to the same recovery process.

The 3GPP has agreed to initiate a random access procedure upon beam failure for beam failure recovery request. Therefore, in an embodiment, the BFRR may comprise random access (RA) procedure/process (or any other initial access procedure) with which the UE attempts to (re)establish the connection via at least one of one or more detected beams. Detected beam means a beam that the UE can detect, i.e. the signal level is high enough for the UE to detect the beam.

Figure 2:
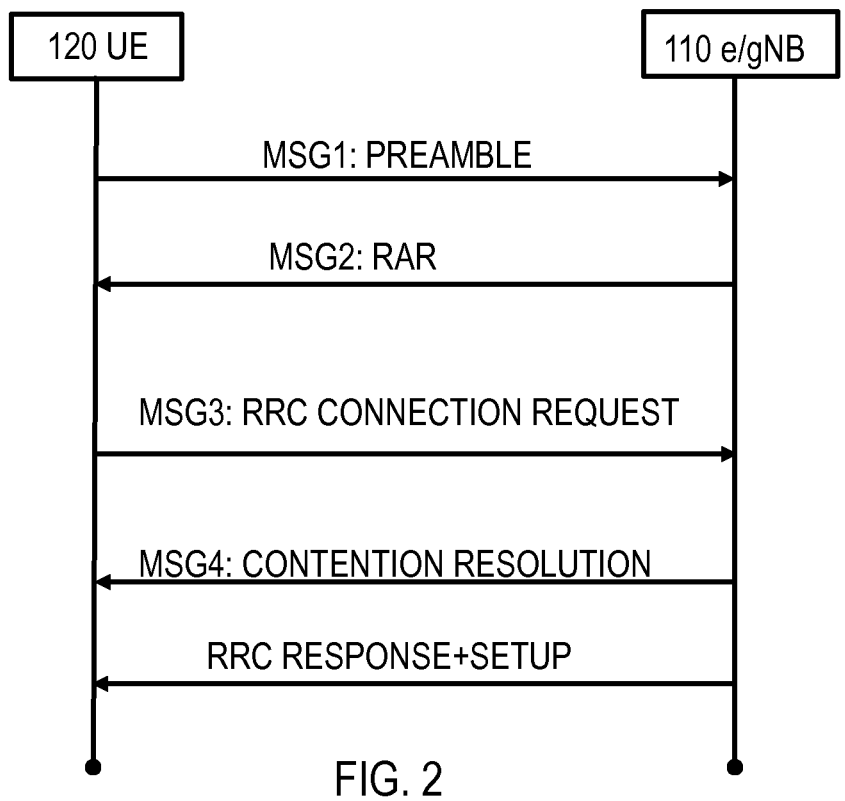
FIG. 2 shows a general overview of a contention based random access process.

Let us briefly take a look at a common RA process (also known as a (physical) RA channel ((P)RACH) procedure/process) shown in FIG. 2 between the UE 120 and the eNB/gNB 110. Although applicable to many networks, we will in the following examples focus mainly on 5G (NR), for the sake of simplicity. In a contention based random access (CBRA) process, showed in FIG. 2, the UE 120 selects one of available PRACH preambles and transmits it in a message (Msg) 1 from the UE 120 to eNB/gNB 110. The UE also needs to derive identity to the network so that network can address it in next step. The identity which UE will use is called RA-RNTI (random access radio network temporary identity). In next step, the gNB 110 sends a random access response (RAR) to UE 120 as Msg2 addressed to UE with the relevant RA-RNTI. Msg2 may by default carry the following information: Temporary C-RNTI, which is another identity given to the UE 120; timing advance (TA) value, which provides means for the UE to compensate for the roundtrip delay caused by UE's distance from the eNB/gNB; and an uplink grant resource, which is assigned as an initial resource to UE so that it can use uplink shared channel. Then, by using the uplink shared channel, the UE 120 sends Msg3 to the network. This Msg3 may be called "RRC connection request message". At this point the UE is identified by the temporary C-RNTI. Thereafter, the eNB/gNB may send Msg4 to the UE for contention resolution. All Msg1, Msg2, Msg3, Msg4 may be MAC level messages. After the RRC connection request of Msg3 is processed, a RRC response will be sent by gNB to the UE 120. In an embodiment, although not shown, the RRC message (e.g. the RRC Connection Setup message) may be multiplexed with the Msg4 (i.e. sent with the MAC contention resolution CE). In some examples, the CBRA procedure may also be used when the UE is in CONNECTED state. In that case, the Msg3 may contain a valid UE identity (C-RNTI) which identifies the UE and the gNB may respond to the UE in Msg4 directly with the C-RNTI.

With contention based RA process, there is some possibility that multiple UEs send PRACH with identical signatures. This may mean the same PRACH preamble from multiple UE reaches the network (e.g. gNB) at the same time. Due to such overlap/collision, the RACH process for one or more of the UEs simultaneously attempting the RACH process with the same preamble may fail. Due to this, the network may need to rely on the contention resolution of Msg4.

However, there is another possibility to avoid collisions. In an embodiment, there are dedicated preambles for the UE to use. The network may have informed the UE which preamble signatures it should use. This kind of RACH process is called contention free random access (CFRA) procedure. In such case, the UE sends a dedicated preamble (after selecting one from a pool of dedicated preambles) and the network responds with random access response (RAR, see Msg2 above). The contention free RA process may ensure that there are no two UEs using the same preamble at the same time, thus avoiding collisions and contention resolution.

As said, BFRR may be used to recover the lost beam and BFRR may include the UE performing the RA process. In one agreement, the 3GPP has proposed that the UE uses contention free process when there is a beam associated with a dedicated "preamble/resource" and the beam is above a threshold. Otherwise the UE uses contention based. In other words, when the BFRR procedure is triggered by triggering the RA procedure, contention free RA (CFRA) process with dedicated (contention free) BFRR preambles are used if suitable beams are available (e.g. a beam with a signal level above a configured reference-signal-received-power, RSRP, threshold is detected). Otherwise, the UE uses contention based RA (CBRA) procedure. The beam recovery procedure may differ from CFRA procedure in terms of gNB response. Although the BFRR resources are configured from the same pool as other PRACH resources, when UE transmits BFRR to indicate new candidate beam for recovery, the gNB response may be monitored using C-RNTI (instead of RA-RNTI as in conventional RA procedure) Currently, the RA procedure is supervised solely with 'ra-PreambleTx-Max' parameter that is configured for common RACH which is used for contention based as well as contention free RA (also for other purposes than BFRR). In more details, the parameter gives an upper limit for the preamble transmit power $P_{RACH}$. $P_{RACH}$ may in an embodiment be determined according $P_{RACH}$=preambleInitialReceivedTargetPower+DELTA_PREAMBLE+(PREAMBLE_TRANSMISSION_COUNTER−1)*powerRampingStep. In this equation, parameter 'preambleInitialReceivedTarget-Power' depicts a power factor which will be used for first transmission of RACH Request, parameter DELTA_PREAMBLE is a preamble format based delta offset, and parameter 'powerRampingStep' defines how much more transmit power is used for each new preamble transmission. Parameter PREAMBLE_TRANSMISSION_COUNTER increases by one with every new preamble transmission. Therefore, according to equation 1, each new preamble transmission may be sent with a higher power, until the upper limit given by 'ra-PreambleTx-Max' is met. Therefore, the upper limit 'ra-PreambleTx-Max' translates into an upper limit for access attempts.

On the other hand, in another agreement, 3GPP has agreed, related to resources for beam failure recovery request transmission, to support Non-contention (i.e. contention free) based PRACH, which uses a resource orthogonal to resources of other PRACH transmissions. Some of the radio resource control (RRC) parameters for the CFRA process for BFRR transmission are shown in Table 1.

TABLE 1

Beam-failure-recovery-request-RACH-Resource configuration

| RRC parameter | Value range | Note/description |
| --- | --- | --- |
| RootSequenceIndex-BFR | {0, 1, . . . , 137} | Short sequence only |

TABLE 1-continued

Beam-failure-recovery-request-RACH-Resource configuration

| RRC parameter | Value range | Note/description |
| --- | --- | --- |
| ZeroCorrelationZoneConfig-BFR | {0, 1, . . . , 15} | Determine cyclic shift. Value range same as IA session |
| PreambleInitial-ReceivedTargetPower-BFR | FFS PreambleTransMax-BFR | Value range same as IA session |
| ra-PreambleIndexConfig-BFR | FFS | Value range same as IA session |
| PreambleTransMax-BFR | FFS | Value range same as IA session |

Here, the parameter PreambleTransMax-BFR' indicates the upper limit for the number of RA attempts allowed before triggering a RA failure, in the same manner as explained above for the 'ra-PreambleTx-Max'. In other words, this agreement suggests to replace 'ra-PreambleTx-Max' with TreambleTransMax-BFR' when the UE is performing a RA process (either CFRA or CBRA) due to BFRR. However, this agreement may not fully take into account that also the contention based RA procedure for the BFRR may be used, in case no suitable beam(s) is/are available (i.e. beams that have high enough signal quality) and/or in case a contention free BFRR preamble is not allocated to the UE.

Based on above, there are mixed understandings/agreements between the following, which leads to unclarities to the underlying RA process due to BFRR:
1. use preambleTransMax-BFR for all RA processes due to BFRR;
2. CBRA also possible for BFRR; and
3. use ra-PreambleTx-Max for all RA processes, as commonly done.

As beam failure recovery is a special event and could use also its own contention-free PRACH (with dedicated BRFF preambles), it may be beneficial to configure PreambleTransMax-BFR' for the UE, as that might give more optimal chances for the UE to recover its serving beam (beam used for monitoring PDCCH) before Random Access problem or unsuccessful beam failure recovery attempt is indicated to upper layers and RLF (Radio Link Failure) triggered. On the other hand, it may not be desirable that more than ra-PreambleTx-Max preambles are transmitted in the contention based RACH, in order to avoid too high power in transmitting the preamble as well as loading the common RACH.

As such, there is a problem of how to utilize the two variables 'ra-PreambleTx-Max' and PreambleTransMax-BFR' in the same RA procedure when BFRR procedure is initiated. The initiation may be performed by the MAC entity of the UE. One questions is e.g. whether to use PreambleTransMax-BFR or ra-PreambleTx-Max for contention based RA access in case of BFRR.

Figure 3A:
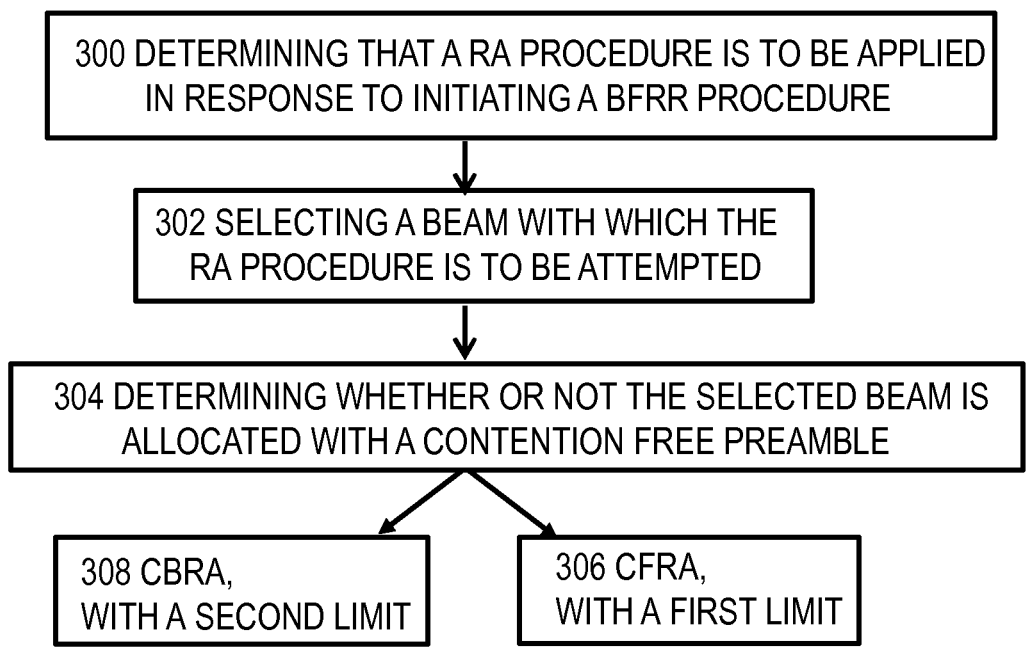
FIGS. 3A, 3B and 4 show methods, according to some embodiments.

To at least partially tackle this problem, there is proposed a solution for initiating the RA process due to BFRR. FIG. 3A depicts an example method. The method may be performed by a user equipment (e.g. the UE 120 of FIG. 1A) having detected that a connection via a specific one or more beam is lost. In the following we will assume that one beam is lost and one is recovered, but the proposal is equally applicable to multibeam recovery.

Accordingly, as shown in FIG. 3A, the UE may in step 300 determine that a RA procedure (or any initial access procedure) is to be applied in response to initiating the BFRR procedure. This may be due to the UE detecting a loss of connection via a given beam. For example, the UE may be communicating via a beam # A and then the signal quality of the beam # A drops below a given threshold (due to e.g. mobility or beam blockage) so that the beam is effectively lost, at least temporarily. In such case the UE may trigger BFRR process to recover that or some other beam to re-establish communication link.

In step 302, the UE may select a beam with which the RA procedure is to be attempted. A beam may be selected once the signal quality is high enough for the beam to be detected or the signal quality is above preconfigured threshold in terms of reference signal received power (RSRP), reference signal received quality (RSRQ), block error rate (BLER), signal-to-interference plus noise ratio (SINR) or the like. Candidate beams may be identified by sweeping subframe (SS) Block or channel state information-reference signal (CSI-RS) signals and the measurements on the said signals. Such SS Block may comprise primary synchronization signal (PSS), secondary synchronization signal (SSS), physical broadcast channel (PBCH), including PBCH demodulation reference signal (DMRS), signals. In some cases the candidate detection may be based on the combined signal quality of CSI-RS and SS Block. This may be decided based on a first signal quality threshold. The UE may be preconfigured with such threshold via network signalling or based on standard configuration, for example. Although the candidate beam can be either SS block or CSI-RS, the UE may have been configured with one signal level threshold, e.g. for CSI-RS, but it may be configured with additional compensation/scaling parameter to derive the signal quality threshold for SS block.

In step 304, the UE determines whether the selected beam is allocated with a contention free preamble. The determination may be based e.g. on identifying a beam index of the selected beam from the reference signals. The UE may be in advance configured such that certain beam indexes are linked with certain dedicated CF preambles to be used with these beams, e.g. in connection of BFRR. A contention free preamble is, as explained above, dedicated for the beam and/or the UE, so that the UE is more likely successful with the respective random access procedure.

In one embodiment, for the beam selection, the UE prioritises beams that have dedicated (contention free) preambles available. Thus, the UE may in an embodiment perform steps 302 and 304 substantially simultaneously.

Upon determining the positive (i.e. the selected beam is allocated with a contention free preamble), the method proceeds to step 306 where the UE applies a contention free random access (CFRA) procedure based on a first limit for an access attempt counter. The first limit may in an embodiment be PreambleTransMax-BFR'. The CFRA procedure has been explained above in connection of FIG. 2.

In an embodiment, applying the CFRA comprises applying a random access preamble from a first pool of preambles dedicated for the BFRR procedure. When the beam is selected for the RA, and if the beam is associated with a CF preamble/resource leading to CFRA, the UE obtains knowledge of which preamble to use via/at the beam selection. Using such CF dedicated preambles/resources may mean that the UE is more likely successful with the RA process.

Upon determining the negative (i.e. the selected beam is not allocated with a contention free preamble), the method proceeds to step 308 where the UE applies a contention based random access, CBRA, procedure based on a second limit for the access attempt counter, wherein the first and second limits are different. The second limit may in an embodiment correspond to 'ra-PreambleTx-Max'. The CBRA procedure has been explained above in connection of FIG. 2.

In an embodiment, applying the CBRA comprises selecting a random access preamble from a second pool of preambles which is not intended exclusively for the BFRR procedure. This may mean that the UE uses preambles that may collide with other UEs preamble selections.

In a further embodiment, it may in step 304 also be checked whether the selected beam has a signal level higher than a second signal quality threshold. If yes, the beam may be used for CFRA in step 306. If not, the CBRA process of step 308 may be used (regardless of whether the beam is associated with a dedicated BFRR preamble or not). Again, the UE may be preconfigured with such second threshold via network signaling or based on standard configuration, for example.

Figure 3B:
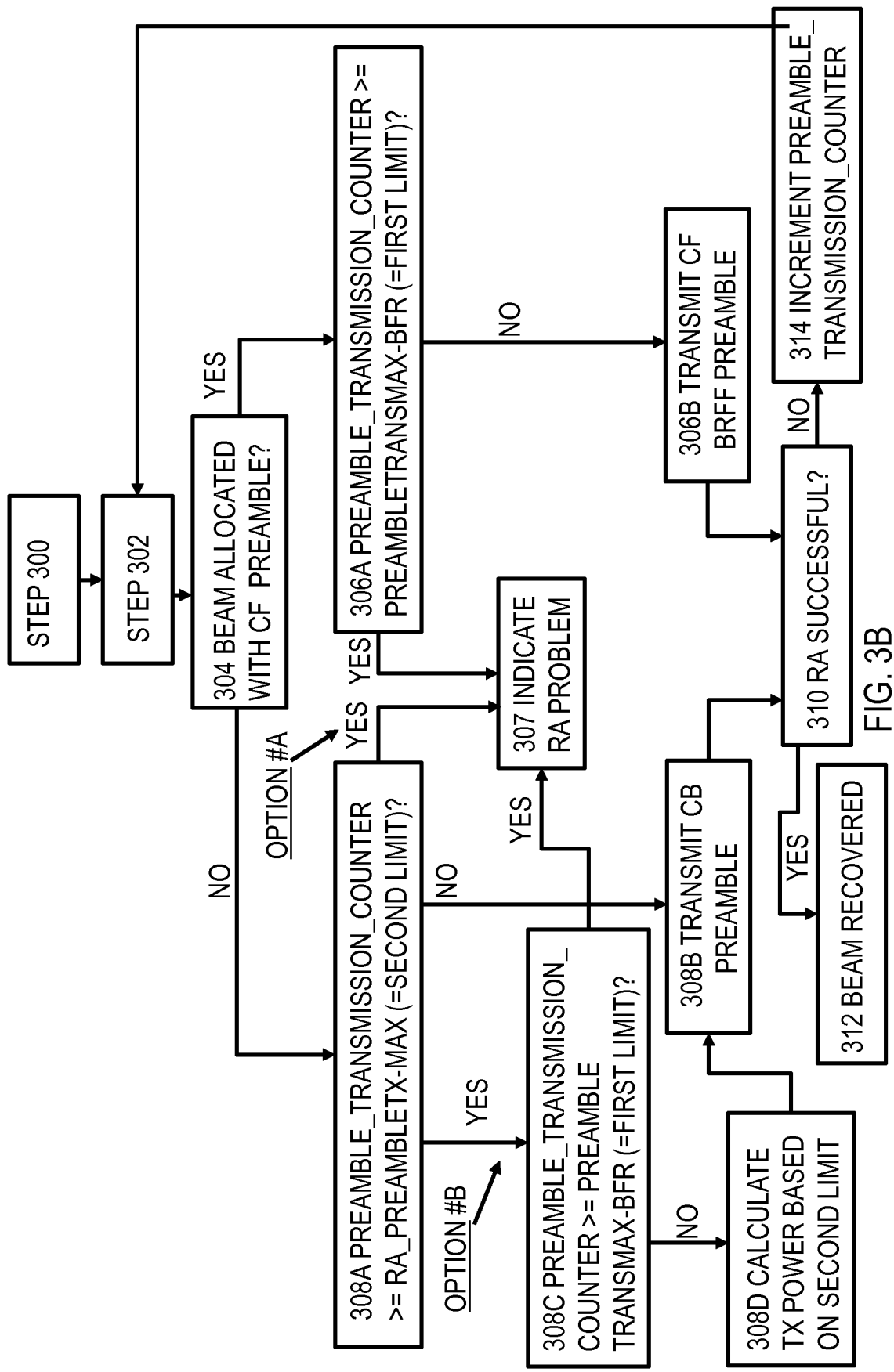

Let us look at the proposal closer with respect to an example embodiment shown in FIG. 3B. The process begins with steps 300 and 302, both of which have been explained above. Thereafter, the process continues to step 304.

When it is detected that CFRA may be used, the process may continue to step 306 of FIG. 3A, which is in FIG. 3B depicted e.g. with blocks 306A, 306B, and 307. In block 306A, it is checked if the PREAMBLE_TRANSMISSION_COUNTER is the same as or higher than the first limit for access attempts. That is, the PREAMBLE_TRANSMISSION_COUNTER, indicating the number of random access attempts made, may serve as the access attempt counter with which the first or second limit is compared with. Such evaluation may be done also before the beam has been selected. In an embodiment, the first limit may be the PreambleTransMax-BFR. Some other parameter may be defined as the first limit in some other embodiments.

If this is the case, then the RA process attempts has reached its upper limit and the process continues to step 307 where the UE indicates a random access problem or unsuccessful beam failure recovery to upper layers, such as to the RRC layer. This is because the number of random access attempts allowed before detecting the random access problem is capped based on the applied first limit. The UE may also trigger a radio link failure (RLF) by upper layers in step 307.

However, if the PREAMBLE_TRANSMISSION_COUNTER is lower than the first limit, meaning that the number of access attempts has not yet reached its upper limit, then the process continues to block 306B. In this block the UE may transmit the contention free preamble.

When it is detected that CFRA is not to be used and CBRA is to be used, then the process continues from block 304 to block 308 of FIG. 3A, which is depicted here with steps 307 and 308A-308D. In block 308A, it is checked if the PREAMBLE_TRANSMISSION_COUNTER is the same as or higher than the second limit for access attempts. In an embodiment, the second limit may be the ra-PreambleTx-Max. Some other parameter may be defined as the second limit in some other embodiments.

If this is the case, then the RA process attempts has reached its upper limit defined by the second limit. In one embodiment (let us call this option #A), the process then continues to step 307 where the UE indicates a random access problem to upper layers, such as to the RRC layer. This is because the number of random access attempts allowed before detecting the random access problem is capped based on the applied second limit. The UE may also trigger a radio link failure (RLF) at upper layers in step 307.

However, if the PREAMBLE_TRANSMISSION_COUNTER is lower than the second limit, meaning that the number of access attempts has not yet reached its upper limit, then the process continues to block 308B. In this block the UE may transmit the contention based PRACH preamble. The UE may select the contention based (common) preamble from the second pool of resources and use that for the RA attempt. The CBRA preamble may be selected randomly from the set of second pool of preambles at each iteration of the method of FIG. 3B. It may be possible the same preamble happens to be selected twice.

As shown with FIG. 3B and described above, it is proposed herein that, in response to BFFR initiation, the PreambleTransMax-BFR parameter is used whenever the dedicated BFRR preamble is to be transmitted by the UE (i.e. in the CFRA process), and the ra-PreambleTx-Max is used whenever a contention based preamble (via common RACH) is to be transmitted by the UE (i.e. in the CBRA process). This may ensure that the upper limits for the CFRA and for the CBRA may be determined independently, thus obtaining optimum usage of both RA processes in response to BFRR initiation. For example, the proposal may allow for more attempts to be conducted with the dedicated BFRR preambles in the CFRA procedure, if such dedicated beams are available. At the same time, the proposal allows for maintaining the UL power interference effect and unnecessary loading in the common CBRA process according to the configured limits for that specific RACH process.

To be noted as well is that in an embodiment the check of whether the applied first or second limit is met/exceeded (i.e. steps 306A or 308A) is performed after the beam, with which random access procedure is to be attempted, has been selected, i.e. after step 302, and before the transmission of the preamble in step 306B or 308B, respectively. This may be beneficial to the efficiency and success rate of the RA procedure. In prior art, the check of whether there is still room for another RA attempt is done before the selection of the beam of step 302. As such, the RA problem may have been indicated to higher layers even if the BFRR could still be used with the contention free RA procedure based on the (higher) first limit. However, according to current embodiment, as the evaluation is done after the beam selection for each preamble transmission, the dedicated beam may still be able to be used even though contention based preamble has reached its upper limit (second limit). In other words, making the evaluation/check after step 302, allows for determining whether it is the first limit or the second limit that needs to be considered (i.e. whether the dedicated BFRR preamble or contention based preamble is to be used). In another embodiment, the check is made before the step 302.

Let us go back to block 308A of FIG. 3B. As explained above, the option # A causes the RA problem to the triggered whenever the PREAMBLE_TRANSMISSION_COUNTER is the same as or higher than the second limit. However, in one embodiment the option # A is not applied but option # B is (depicted with blocks 308C and 308D). In this option, when the PREAMBLE_TRANSMISSION_COUNTER is the same as or higher than the second limit (i.e. upon determining that the second limit is met with the CBRA procedure), the process continues to block 308C where the CBRA procedure is continued based on the first limit (not the second limit). In option # B, the first limit may be higher than the second limit. I.e. PreambleTransMax-BFR may be higher than ra-PreambleTx-Max. Thus, continuing with option # B may allow for more CBRA attempts than option # A, possibly leading to higher a success rate for the beam recovery.

In an embodiment, the continuing comprises gapping a transmit power for the random access attempt based on the second limit in block 308D, before transmission of the CB preamble in step 308B. As shown above, the max-parameter (first or second limit) indicates not only the upper limit for the number of access attempts but also the upper limit for the preamble transmission power. So, in this embodiment, even though the number of access attempts is enlarged by using the first limit, it may be required the maximum power to be used for contention based preamble transmission is still capped by the ra-PreambleTx-Max parameter, i.e. by the second limit (assuming first limit is higher than second limit). This may beneficially decrease the UL power interference effect and unnecessary loading in the common RACH. Thus, option #B may still be CBRA process using CB preambles with CB-specific preamble transmission power limit, but with a higher number of RA iterations/attempts allowed.

In yet one embodiment, the continuing of option # B is applied only in connection of the random access preamble first selected from the second pool of preambles after the continuation has been applied.

As explained above, the CBRA typically uses CB preambles from the second pool of resources. However, in one embodiment of option # B, the continuing in blocks 308C and 308D comprises selecting a random access preamble from a third pool of preambles comprising contention based preambles dedicated for the BFRR procedure. This may increase the chances of successful random access attempt.

After either of steps 306B or 308B, the process continues to step 310, in which it is checked if the RA procedure is successful. If it is, the process goes to step 312 where the beam selected in step 302 has been used successfully for the access attempt and the communication of the UE may continue. If the RA procedure is not successful, the process continues to step 314 where the access attempt counter (e.g. PREAMBLE_TRANSMISSION_COUNTER) is incremented by one. After that, the method proceeds to step 302, where a new (or the same) beam is selected for random access attempt, and proceeds from that block as explained above.

In a yet alternative embodiment, the selection of the first or second limit/parameter is done based on the procedure that triggered the RA procedure, e.g. for a beam failure recovery request procedure the PreambleTransMax-BFR is used (regardless of whether the CBRA or CFRA is used) and otherwise ra-PreambleTx-Max is used.

Figure 4:
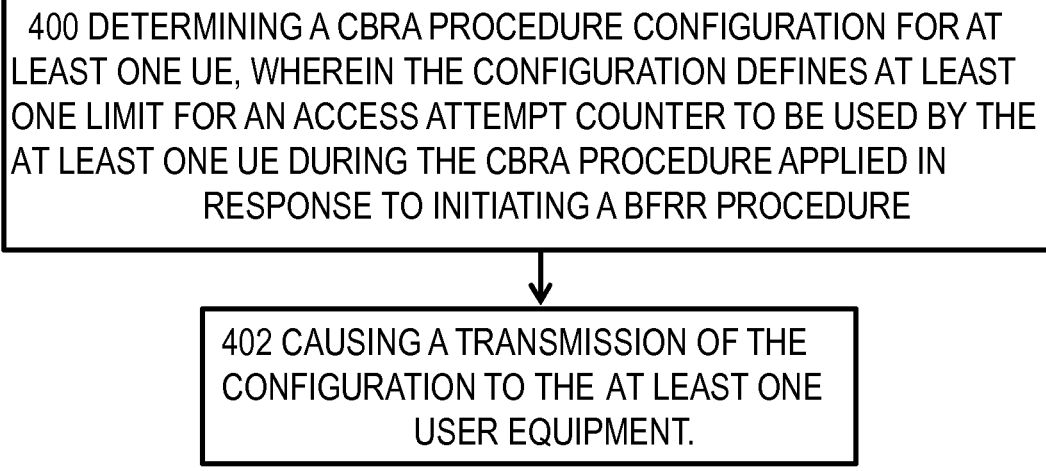

FIG. 4 shows a method which may be performed by an access/control node of the network, such as the eNB/gNB 110 of FIG. 1A. The method comprises, in step 400, the access node determining a CBRA procedure configuration for at least one user equipment. The configuration may define at least one limit for an access attempt counter to be used by the at least one UE (e.g. the UE 120) during the CBRA procedure applied in response to initiating the BFRR procedure.

In one embodiment, the configuration comprises an indication to use a second limit for the CBRA procedure, wherein the second limit is different than a first limit useable with respect to the CFRA procedure. Thus, the limit may in an embodiment be the second limit (e.g. option # A in FIG. 3B).

In an embodiment, the configuration further comprises the first limit which is to be used when the second limit is met with the CBRA procedure, wherein the first limit is higher than the second limit. Thus, the limit may in an embodiment comprise both first and second limits (e.g. option # B in FIG. 3B). In this case, the respective UE may also be configured with instructions on how to use the limits (e.g. according to the process depicted for option # B above).

In one embodiment, the configuration further comprises an indication to select a random access preamble from a pool of contention based preambles dedicated for the BFRR procedure while the user equipment is performing the CBRA procedure based on the first limit, as otherwise the UE would select the preamble automatically from the common second pool of CB preambles in the CBRA process.

In one embodiment, the NW may configure the UE with one or more preamble transmission power limits the UE is to use during the CBRA process. E.g. the UE may be instructed to gap the transmission power based on the second limit while the first limit for the access attempt counter is used during the CBRA pro-cedure (as in options # A and # B). In another embodiment, the UE may be configured to gap the transmit power based on the first limit. In yet one embodiment the transmission power limit may be independent of the first and second limits.

In one embodiment, the network may configure the UE with one or more access attempt counter limits for the CFRA due to BFRR. E.g. the UE may be configured with the first limit (e.g. PreambleTransMax-BFR) to be used when applying CFRA due to BFRR. In some other embodiment, the UE may be configured to use the second limit, although the UE may use CF BFRR preambles.

In one embodiment, the network may configure the UE with one or more transmit power limits for the CFRA due to BFRR. The limit may be for example based on the first limit, second limit, or independent of the first limit and/or second limit. That is, the network (e.g. the access node 110) may configure which power limit to apply for the first pool of preambles, if the applied PRACH is the same for the both preamble types, e.g., 64 preambles per PRACH would be same for CFRA and CBRA.

In one embodiment, the configuration may comprise information regarding which preambles (from first pool, second pool, and/or third pool) to use for the CBRA (e.g. for option # A and for option # B) and/or for the CFRA.

In step 402, the access node may cause a transmission of the configuration to the at least one UE. This may be beneficial as then the network may control how the BFRR related RA procedures are used, thus controlling also the UL interference and the CB PRACH load situation. In one embodiment, the network access node may transmit the configuration in initial access of the UE, or dynamically as needed. The configuration may be transmitted as RRC message, for example.

Although it has been described the first limit is higher than the second limit, in some embodiments the second limit is higher than the first limit. This may be used to limit the loading of the CFRA procedure, for example.

Figure 5:
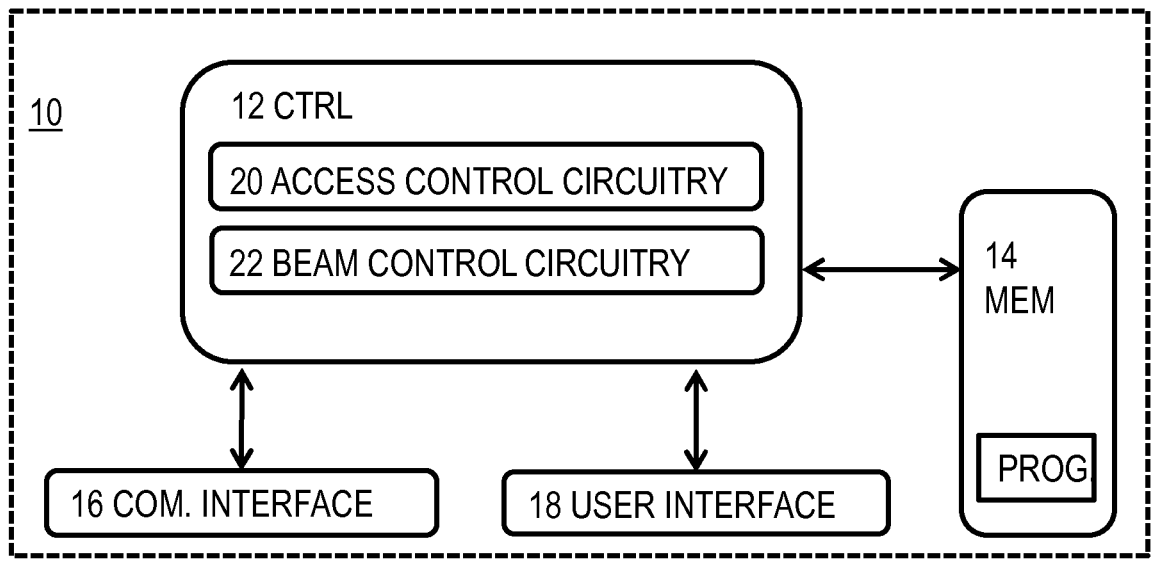
FIGS. 5 and 6 illustrate apparatuses, according to some embodiments.

An embodiment, as shown in FIG. 5, provides an apparatus 10 comprising a control circuitry (CTRL) 12, such as at least one processor, and at least one memory 14 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor based memory devices, flash memory, magnetic memory devices and systems, optical memory devices and systems, fixed memory and removable memory.

In an embodiment, the apparatus 12 may comprise the terminal device of a communication system, e.g. a user terminal (UT), a computer (PC), a laptop, a tabloid computer, a cellular phone, a mobile phone, a communicator, a smart phone, a palm computer, a mobile transportation apparatus (such as a car), a household appliance, or any other communication apparatus, commonly called as UE in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly. The apparatus may be caused to execute the functionalities of some of the above described processes, such as the steps of FIGS. 3A and 3B.

The apparatus may further comprise communication interface (TRX) 16 comprising hardware and/or software for realizing communication connectivity according to one or more communication protocols. The TRX may provide the apparatus with communication capabilities to access the radio access network, for example. The apparatus may also comprise a user interface 18 comprising, for example, at least one keypad, a microphone, a touch display, a display, a speaker, etc. The user interface may be used to control the apparatus by the user.

The control circuitry 12 may comprise an access control circuitry 20 for controlling an access attempts made by the apparatus based on CBRA and/or CFRA. The circuitry 20 may e.g. select whether to use CBRA or CFRA for the access attempt. Furthermore, the circuitry may control whether the relevant one of the first and second limits are met during the CBRA or CFRA, according to any of the embodiments. The circuitry 20 may also control the preamble transmission and the relevant transmit power limits, for example. The control circuitry 12 may further comprise a beam selection circuitry 22 e.g. for selecting the beam with which the access attempt is to be made.

Figure 6:
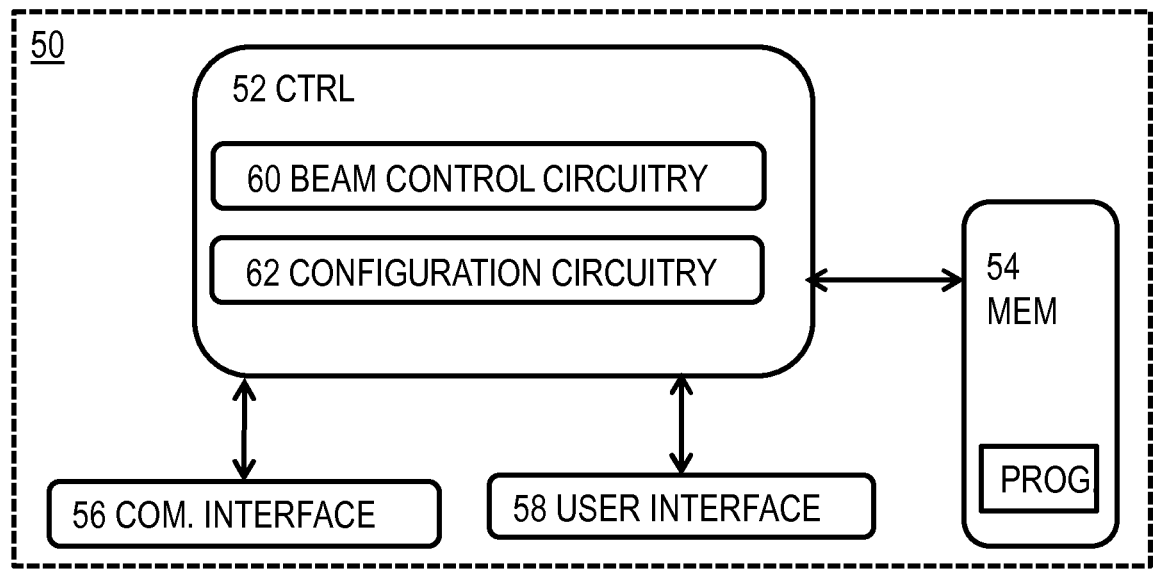

An embodiment, as shown in FIG. 6, provides an apparatus 50 comprising a control circuitry (CTRL) 52, such as at least one processor, and at least one memory 54 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor based memory devices, flash memory, magnetic memory devices and systems, optical memory devices and systems, fixed memory and removable memory.

In an embodiment, the apparatus 50 may be or be comprised in a first network node of the first network, such as in gNB/gNB-CU/gNB-DU of 5G or in eNB/eNB-CU/eNB-DU of EUTRA. In an embodiment, the apparatus is or is comprised in the network node 110. The apparatus may be caused to execute the functionalities of some of the above described processes, such as the steps of FIG. 4.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation. In an embodiment, the server may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 50 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be stand-alone apparatuses communicating with each other via a radio path or via a wired connection. Alternatively, they may be located in a same entity communicating via a wired connection, etc. It should be understood that the edge cloud or edge cloud server may serve a plurality of radio nodes or a radio access networks. In an embodiment, at least some of the described processes may be performed by the central unit. In another embodiment, the apparatus 50 may be instead comprised in the distributed unit, and at least some of the described processes may be performed by the distributed unit.

In an embodiment, the execution of at least some of the functionalities of the apparatus 50 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 50 controls the execution of the processes, regardless of the location of the apparatus and regardless of where the processes/functions are carried out.

The apparatus may further comprise communication interface (TRX) 56 comprising hardware and/or software for realizing communication connectivity according to one or more communication protocols. The TRX may provide the apparatus with communication capabilities to access the radio access network, for example. The apparatus may also comprise a user interface 58 comprising, for example, at least one keypad, a microphone, a touch display, a display, a speaker, etc. The user interface may be used to control the apparatus by the user.

The control circuitry 52 may comprise a beam control circuitry 60 for controlling which one or more beams are to be provided in the cell covered by the access node, for example. The control circuitry 52 may further comprise a configuration circuitry 62 for providing configuration(s) to at least one UE. One example configuration may include CBRA configuration, as explained above. The configuration may indicate which parameters to use for the CBRA that is to be applied due to BFRR initiation. The configuration may include e.g. the access attempt and/or transmit power limits to the CBRA process. Another possible configuration may be CFRA configuration, indicating configuration for the CFRA that is to be applied due to BFRR initiation. The configuration may include e.g. the access attempt and/or transmit power limits to the CFRA process. In an embodiment, an apparatus (e.g. apparatus 10 or 50) carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Following is a list of some aspects of the invention.

According to a first aspect, there is provided an apparatus comprising at least one processor and at least one memory including a computer program code, wherein the at least one memory and the computer program code are configured, with the at least one processor, to cause the apparatus to perform operations comprising: determining that a random access procedure is to be applied in response to initiating a beam failure recovery request, BFRR, procedure; selecting a beam with which the random access procedure is to be attempted; determining whether or not the selected beam is allocated with a contention free preamble; and performing one of the following: 1) upon determining the positive, applying a contention free random access, CFRA, procedure based on a first limit for an access attempt counter; and 2) upon determining the negative, applying a contention based random access, CBRA, procedure based on a second limit for the access attempt counter, wherein the first and second limits are different.

Various embodiments of the first aspect may comprise at least one feature from the following bulleted list:
 applying the CFRA comprises applying a random access preamble from a first pool of preambles dedicated for the BFRR procedure
 applying the CBRA comprises selecting a random access preamble from a second pool of preambles which is not intended exclusively for the BFRR procedure.
 wherein the number of random access attempts allowed before detecting a random access problem is capped based on the applied first or second limit.
 wherein the first limit is higher than the second limit, and continuing with the CBRA procedure based on the first limit upon determining that the second limit is met with the CBRA procedure.
 wherein the continuing comprises gapping a transmit power for the random access attempt based on the second limit.
 wherein the continuing is applied only in connection of the random access preamble first selected from the second pool of preambles.
 wherein the continuing comprises selecting a random access preamble from a first third pool of contention based preambles dedicated for the BFRR procedure.
 checking whether the applied first or second limit is met after the beam, with which random access procedure is to be attempted, has been selected.

According to a second aspect, there is provided an apparatus comprising at least one processor and at least one memory including a computer program code, wherein the at least one memory and the computer program code are con-figured, with the at least one processor, to cause the apparatus to perform oper-ations comprising: determining a contention based random access, CBRA, procedure configu-ration for at least one user equipment, wherein the configu-ration defines at least one limit for an access attempt counter to be used by the at least one user equipment during the CBRA procedure applied in response to initiating a beam failure recovery request, BFRR, procedure; and causing a transmission of the configuration to the at least one user equipment.

Various embodiments of the second aspect may comprise at least one feature from the following bulleted list:
 wherein the configuration comprises an indication to use a second limit for the CBRA procedure, wherein the second limit is different than a first limit useable with respect to a contention free random access, CFRA, procedure.
 wherein the configuration further comprises an indication of the first limit, which is to be used when the second limit is met with the CBRA procedure, wherein the first limit is higher than the second limit.
 wherein the configuration further comprises an indication to gap a transmit power for the random access attempt based on the second limit while the first limit for the access attempt counter is used during the CBRA pro-cedure.

According to a third aspect, there is provided a method, comprising: determining, by a user equipment, that a ran-dom access procedure is to be applied in response to initiating a beam failure recovery request, BFRR, procedure; selecting a beam with which the random access procedure is to be attempted; determining whether or not the selected beam is allocated with a contention free preamble; and performing one of the following: 1) upon determining the positive, applying a contention free random access, CFRA, procedure based on a first limit for an access attempt counter; and 2) upon determining the negative, applying a contention based random access, CBRA, procedure based on a second limit for the access attempt counter, wherein the first and second limits are different.

Various embodiments of the third aspect may comprise at least one feature from the bulleted list under the first aspect.

According to a fourth aspect, there is provided a method, comprising: determining, by a network node, a contention based random access, CBRA, procedure configuration for at least one user equipment, wherein the configuration defines at least one limit for an access attempt counter to be used by the at least one user equipment during the CBRA procedure applied in response to initiating a beam failure recovery request, BFRR, procedure; and causing a transmission of the configuration to the at least one user equipment.

Various embodiments of the fourth aspect may comprise at least one feature from the bulleted list under the second aspect.

According to a fifth aspect, there is provided a computer program product comprising program instructions which, when loaded into an apparatus, execute a method, compris-ing: determining that a random access procedure is to be applied in response to initiating a beam failure recovery request, BFRR, procedure; selecting a beam with which the random access procedure is to be attempted; determining whether or not the selected beam is allocated with a con-tention free preamble; and performing one of the following: 1) upon determining the positive, applying a contention free random access, CFRA, procedure based on a first limit for an access attempt counter; and 2) upon determining the negative, applying a contention based random access, CBRA, procedure based on a second limit for the access attempt counter, wherein the first and second limits are different.

Various embodiments of the fifth aspect may comprise at least one feature from the bulleted list under the first aspect.

According to a sixth aspect, there is provided a computer program product comprising program instructions which, when loaded into an apparatus, execute a method, compris-ing: determining a contention based random access, CBRA, procedure configuration for at least one user equipment, wherein the configuration defines at least one limit for an access attempt counter to be used by the at least one user equipment during the CBRA procedure applied in response to initiating a beam failure recovery request, BFRR, procedure; and causing a transmission of the configuration to the at least one user equipment.

Various embodiments of the sixth aspect may comprise at least one feature from the bulleted list under the second aspect.

The computer program product of the fifth or the sixth aspects may be embodied on a distribution medium readable by a computer.

According to a seventh aspect, there is provided an apparatus comprising: means for determining that a random access procedure is to be applied in response to initiating a beam failure recovery request, BFRR, procedure; means for selecting a beam with which the random access procedure is to be attempted; means for determining whether or not the selected beam is allocated with a contention free preamble; and means for performing one of the following: 1) upon determining the positive, applying a contention free random access, CFRA, procedure based on a first limit for an access attempt counter; and 2) upon determining the negative, applying a contention based random access, CBRA, procedure based on a second limit for the access attempt counter, wherein the first and second limits are different.

Various embodiments of the seventh aspect may comprise at least one feature from the bulleted list under the first aspect.

According to an eight aspect, there is provided an apparatus comprising: means for determining a contention based random access, CBRA, procedure configuration for at least one user equipment, wherein the configuration defines at least one limit for an access attempt counter to be used by the at least one user equipment during the CBRA procedure applied in response to initiating a beam failure recovery request, BFRR, procedure; and means for causing a transmission of the configuration to the at least one user equipment.

Various embodiments of the seventh aspect may comprise at least one feature from the bulleted list under the second aspect.

According to a ninth aspect, there is provided an apparatus comprising means configured to cause the apparatus to perform the method according to any of aspects 3 to 4.

According to a tenth aspect, there is provided a computer system, comprising one or more processors; at least one data storage, and one or more computer program instructions to be executed by the one or more processors in association with the at least one data storage for carrying out a process according to any of aspects 3 to 4.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor and at least one memory including a computer program code, wherein the at least one memory and the computer program code are configured, with the at least one processor, to cause the apparatus to:
determine that a random access procedure is to be initiated in response to initiating a beam failure recovery procedure;
select a beam with which the random access procedure is to be attempted;
determine to apply a first limit for an access attempt counter based on the random access procedure being initiated in response to initiating the beam failure recovery procedure, wherein a second limit for the access attempt counter is applied when the random access procedure is initiated in response to other than initiating the beam failure recovery procedure, the first and second limits being different;
determine to apply the first limit for the access attempt counter regardless of whether the random access attempt on the selected beam is a contention free random access (CFRA) or a contention based random access (CBRA); and
perform the random access procedure based on the first limit on the selected beam.

2. The apparatus of claim 1, wherein the CFRA is applied when the selected beam is allocated with a contention free preamble and the CBRA is applied when the selected beam is allocated with a contention based preamble.

3. The apparatus of claim 1, wherein the at least one memory and the computer program code are further configured, with the at least one processor, to cause the apparatus to: apply the CFRA which comprises applying a random access preamble from a first pool of preambles dedicated for the beam failure recovery procedure; or apply the CBRA which comprises selecting a random access preamble from a second pool of preambles which is not intended exclusively for the beam failure recovery procedure.

4. The apparatus of claim 1, wherein a number of random access attempts allowed before detecting a random access problem is capped based on the applied first limit.

5. The apparatus of claim 1, wherein the at least one memory and the computer program code are configured, with the at least one processor, to cause the apparatus to: check whether the applied first limit is met after the beam, with which random access procedure is to be attempted, has been selected.

6. The apparatus of claim 1, wherein selecting the beam comprises selecting a beam with a signal quality above a first preconfigured threshold in terms of one of reference signal received power (RSRP), reference signal received quality (RSRQ), block error rate (BLER), or signal-to-interference plus noise ratio (SINR).

7. The apparatus of claim 1, wherein the at least one memory and the computer program code are configured, with the at least one processor, to cause the apparatus to: detect whether or not the selected beam has a signal level higher than a second preconfigured threshold; upon detecting the selected beam has a signal level higher than the second preconfigured threshold, apply the CFRA for the selected beam;
upon detecting the selected beam has a signal level lower than the second preconfigured threshold, apply the CBRA for the selected beam.

8. The apparatus of claim 1, wherein the apparatus is a user equipment and the apparatus is operating according to at least one of the Long-Term Evolution (LTE), the Long-Term Evolution Advanced (LTE-A), the New Radio, or 5G.

9. A method, comprising:
determining that a random access procedure is to be initiated in response to initiating a beam failure recovery procedure;

selecting a beam with which the random access procedure is to be attempted;

determining to apply a first limit for an access attempt counter based on the random access procedure being initiated in response to initiating the beam failure recovery procedure, wherein a second limit for the access attempt counter is applied when the random access procedure is initiated in response to other than initiating the beam failure recovery procedure, the first and second limits being different;

determining to apply the first limit for the access attempt counter regardless of whether the random access attempt on the selected beam is a contention free random access (CFRA) or a contention based random access (CBRA); and performing the random access procedure based on the first limit on the selected beam.

10. The method of claim 9, wherein the CFRA is applied when the selected beam is allocated with a contention free preamble and the CBRA is applied when the selected beam is allocated with a contention based preamble.

11. The method of claim 9, further comprising: applying the CFRA which comprises applying a random access preamble from a first pool of preambles dedicated for the beam failure recovery procedure; or applying the CBRA which comprises selecting a random access preamble from a second pool of preambles which is not intended exclusively for the beam failure recovery procedure.

12. The method of claim 9, wherein a number of random access attempts allowed before detecting a random access problem is capped based on the applied first limit.

13. The method of claim 9, further comprising:
checking whether the applied first limit is met after the beam, with which random access procedure is to be attempted, has been selected.

14. The method of claim 9, wherein selecting the beam comprises selecting a beam with a signal quality above a first preconfigured threshold in terms of one of reference signal received power (RSRP), reference signal received quality (RSRQ), block error rate (BLER), or signal-to-interference plus noise ratio (SINR).

15. The method of claim 9, further comprising: detecting whether or not the selected beam has a signal level higher than a second preconfigured threshold; and upon detecting the selected beam has a signal level higher than the second preconfigured threshold, apply the CFRA for the selected beam; upon detecting the selected beam has a signal level lower than the second preconfigured threshold, apply the CBRA for the selected beam.

16. The method of claim 9, wherein the method is performed by a user equipment operating according to at least one of the Long-Term Evolution (LTE), the Long-Term Evolution Advanced (LTE-A), the New Radio, or 5G.

17. A computer program product embodied on a non-transitory computer readable medium and comprising program instructions which, when executed, cause an apparatus at least to: determine that a random access procedure is to be initiated in response to initiating a beam failure recovery procedure; select a beam with which the random access procedure is to be attempted; determine to apply a first limit for an access attempt counter based on the random access procedure being initiated in response to initiating the beam failure recovery procedure, wherein a second limit for the access attempt counter is applied when the random access procedure is initiated in response to other than initiating the beam failure recovery procedure, the first and second limits being different; determine to apply the first limit for the access attempt counter regardless of whether the random access attempt on the selected beam is a contention free random access (CFRA) or a contention based random access (CBRA); and perform the random access procedure based on the first limit on the selected beam.

18. The computer program product of claim 17, wherein the CFRA is applied when the selected beam is allocated with a contention free preamble and the CBRA is applied when the selected beam is allocated with a contention based preamble.

19. The computer program product of claim 17, wherein the apparatus is further caused to: apply the CFRA which comprises applying a random access preamble from a first pool of preambles dedicated for the beam failure recovery procedure; or apply the CBRA which comprises selecting a random access preamble from a second pool of preambles which is not intended exclusively for the beam failure recovery procedure.

20. The computer program product of claim 17, wherein a number of random access attempts allowed before detecting a random access problem is capped based on the applied first limit.

* * * * *